United States Patent [19]

Lermann et al.

[11] 4,155,635

[45] May 22, 1979

[54] PHOTOGRAPHIC CAMERA

[75] Inventors: Peter Lermann, Narring; Günter Fauth, Unterhaching, both of Fed. Rep. of Germany

[73] Assignee: AGFA-Gevaert, A.G., Leverkusen, Fed. Rep. of Germany

[21] Appl. No.: 819,416

[22] Filed: Jul. 26, 1977

[30] Foreign Application Priority Data

Jul. 30, 1976 [DE] Fed. Rep. of Germany ....... 2634384

[51] Int. Cl.² .................. G03B 17/50; G03B 17/04; G03B 17/42
[52] U.S. Cl. .................................... 354/86; 354/187; 354/204
[58] Field of Search ............... 354/86, 205, 206, 208, 354/213, 187, 204, 212

[56] References Cited

U.S. PATENT DOCUMENTS

| 1,371,440 | 3/1921 | Resch | 354/208 X |
| 2,335,439 | 11/1943 | Nerwin et al. | 354/204 |
| 3,699,865 | 10/1972 | Erlichman | 354/212 X |
| 3,852,781 | 12/1974 | Erlichman | 354/86 |
| 3,936,850 | 2/1976 | Goto | 354/86 X |

FOREIGN PATENT DOCUMENTS 815298 10/1951 Fed. Rep. of Germany ......... 354/204

Primary Examiner—Donald A. Griffin
Attorney, Agent, or Firm—Michael J. Striker

[57] ABSTRACT

A photographic camera has a film transporting mechanism which requires different amounts of energy during different phases of each film-transporting cycle. A gear drive is provided which furnishes to the mechanism differing energy amounts while itself receiving a substantially constant energy input.

7 Claims, 8 Drawing Figures

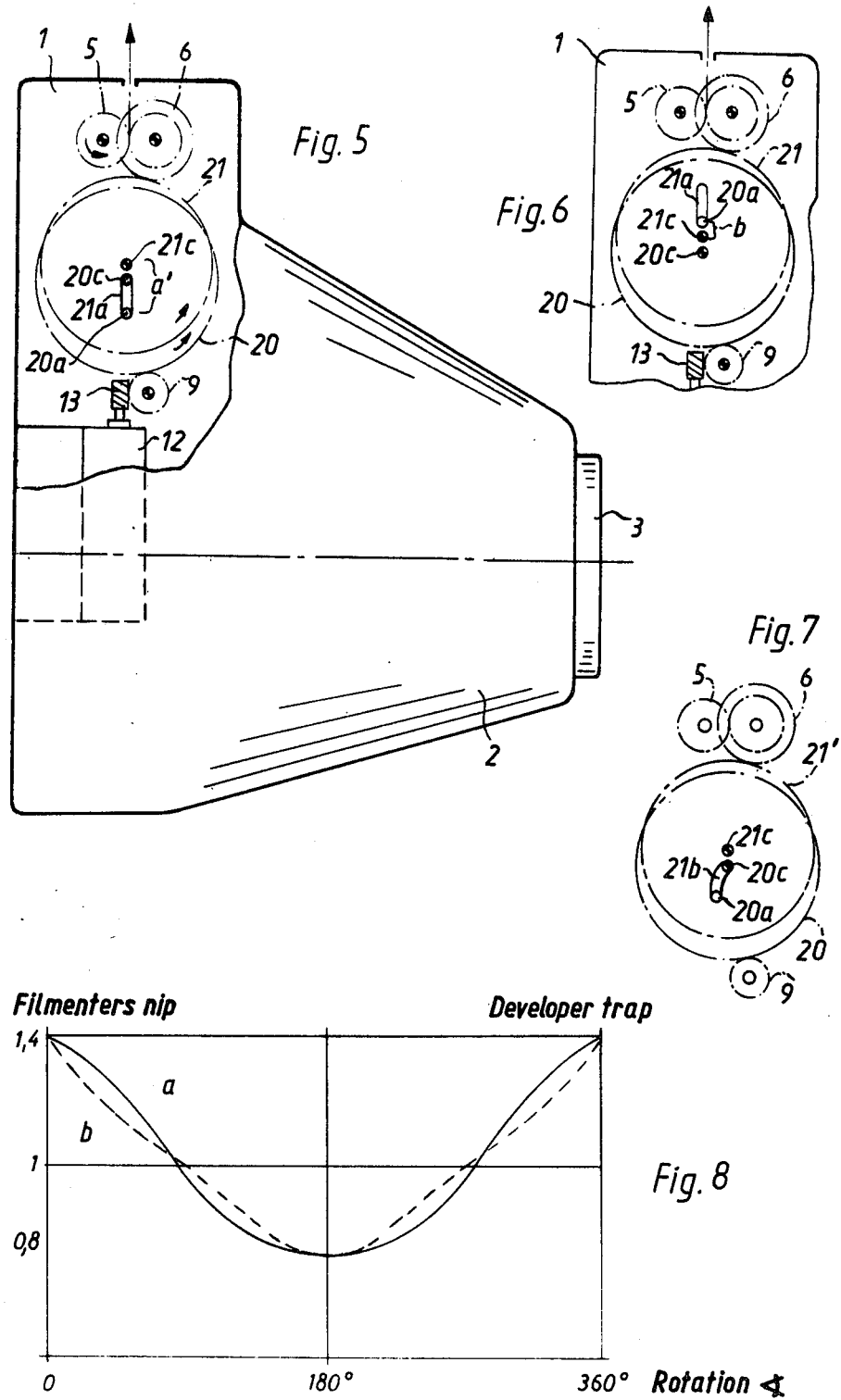

PHOTOGRAPHIC CAMERA

BACKGROUND OF THE INVENTION

1. Field of the Invention

This invention relates to photographic cameras.

More particularly, the invention relates to a camera wherein a film transporting mechanism is operated to advance a film (or film section) by the length of picture.

2. The Prior Art

Various proposals have been made for transporting film in still cameras, including in the types of cameras which are generically known as instant-picture cameras. It has been suggested to use a spring- or electrically-operated transporting mechanism, a rotary film-transporting knob, a pivotable lever, a crank which is turned by hand when film is to be transported, or a slidable element.

In one camera which is collapsible, i.e., where a lens mount is movable relative to the camera body between a collapsed (shut) and an extended (open) position, the proposal has been made to effect film transportation as a function of the movement of the lens mount relative to the camera body. This can be done by, e.g., providing an arcuate gear segment which pivots with the lens mount about a pivot axis thereof and which drives a step-up gearing.

The problem with all proposed solutions is that they do not—or not adequately—take account of the fact that different film-transporting forces are required during different film-transporting phases. This difference in force requirements during different phases of each film-transporting cycle is particularly pronounced when the transporting function is coupled with one or more other functions, i.e. when it is desired that the same force which effects film transportation should also, e.g., cock the camera shutter, flip a mirror of the camera or tension (to store energy) a device which ignites the film flash arrangement (e.g. by impact upon a piezoelectric element).

If the camera is of the type having manual film transport (e.g. via a turnable knob or pivotable lever), it was heretofore simply left to the user to exert greater force during that phase of the film transporting cycle during which such force was needed. If the film transporting mechanism was motor driven, the motor was so constructed that it was able to furnish the maximum torque required of it. Of course, this meant that when the end of, e.g., a roll of film was reached, the motor was then also powerful enough to tear the film end loose from the film cassette or film cartridge and/or to tear the film sprocket holes.

Instant-picture cameras have particular problems with the matter of different film-transporting forces during different phases of the film-transporting cycle. In these cameras the exposed film sheet is withdrawn from a film pack and must travel through the nip between a pair of transporting rollers. These also act as developer-spreader rollers. Thus, at the beginning of the film transport (as the film sheet moves into the nip) the rollers encounter a developer-containing pouch of the film sheet and must squeeze the developer out of this pouch (requiring increased force). The subsequent transportation of the film and spreading of the developer over the exposed film area requires less force. However, toward the end of the transportation cycle the residual developer must be squeezed into a developer trap; since this constitutes a thickening of the film sheet, as does the pouch, increased force is again required. Moreover, depending upon the camera it may also be necessary to cock the shutter and/or store energy for the percussion-type flash lamp triggering mechanism.

The prior-art cameras of this type either had manual film transport—and took no note of the problems, or they used electrical devices and switched additional batteries into the drive circuit when increased torque was required (or else a mechanical speed-compensator was employed).

None of these expedients are fully satisfactory and/or reliable. They are too bulky for the compact cameras which are being more and more demanded, or they are too complicated and/or expensive.

SUMMARY OF THE INVENTION

It is therefore an object of the invention to overcome the disadvantages outlined above.

More particularly, it is an object of the invention to provide an improved camera which avoids these disadvantages.

Another object of the invention is to provide a camera of the type in question, which utilizes a film transport wherein the transporting force is fully or substantially uniform at all times, the drive and the power source are compact, and adequate force is available even under peak-load conditions.

In keeping with these objects, and with others which will become apparent hereafter, one aspect of the invention resides in a camera having a film transporting mechanism which has different drive force requirements during different parts of a film transporting cycle, and a gear drive for the mechanism to provide drive force thereto. The gear drive is so constructed that the input force required to operate it is substantially uniform during the entire transporting cycle, whereas the gear drive yields peak forces to the transporting mechanism during certain phases (preferably, but not necessarily the initial and the terminal phases) of the transporting cycle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a broken-away side view of a further embodiment of the invention;

FIG. 6 shows a detail of FIG. 5 in the condition of maximum power output;

FIG. 7 is a view showing a modification of the drive in FIGS. 5 and 6; and

FIG. 8 is a diagram, showing the transmission ratios of the drives illustrated in FIGS. 1-7.

DESCRIPTION OF THE PREFERRED EMBODIMENTS

Figure 1:
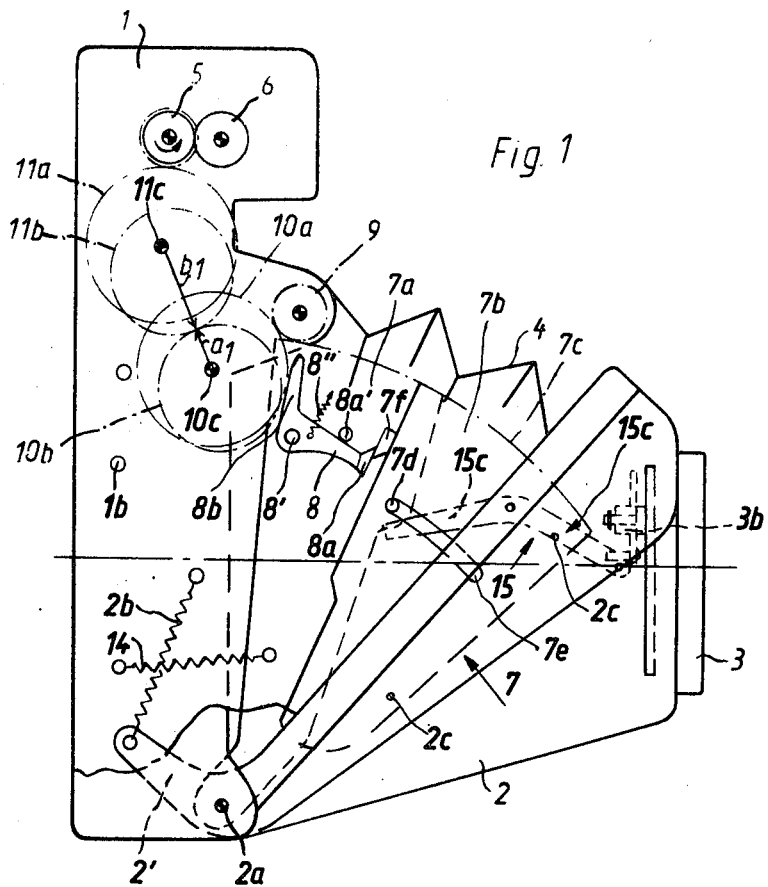
FIG. 1 is a diagrammatic broken-away side view of a camera embodying the invention, showing the drive at the beginning of the transporting cycle.
Figure 2:
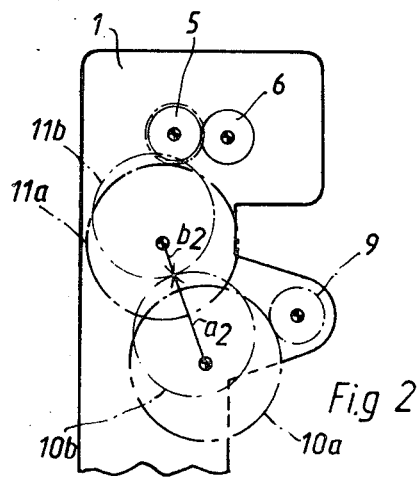
FIG. 2 shows the drive of FIG. 1 in the condition of maximum force output.
Figure 3:
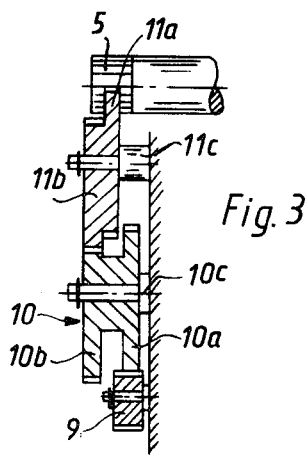
FIG. 3 is a section through a developed view of the gear drive of FIGS. 1 and 2.

The camera shown in FIGS. 1-4 is of the collapsible type, having a camera body or housing 1 to which a (rigid) lens mount 2 is secured for pivotal movement about the axis defined by pivot 2a. To prevent the entry of light into the interior of the camera, the body 1 and the lens mount 2 are connected with one another by a bellows 4 (e.g., of rubberized cloth, synthetic plastic material or the like) in a manner known per se. The lens mount 2 carries a lens 3 and a shutter 3a having a shutter-cocking mechanism 3b. The lens, shutter and cocking mechanism are known per se and will therefore not be further described.

Although the concept of the invention is applicable to collapsible cameras in general, it has herein been illustrated in connection with an instant-picture camera having a pair of film-transporting nip rollers 5 and 6 between which each film (not shown) must pass subsequent to exposure, so that the rollers 5, 6 spread the developer fluid over the picture area of the film. For this purpose at least one of the rollers 5, 6 must be driven; here the roller 5 is diagrammatically shown as being provided with a gear (at one axial end thereof). The roller 5 is driven in rotation (see the arrow) via a pinion 9 which transmits motion to a gear arrangement composed of two double gears 10a, 10b and 11a, 11b, respectively. Gears 10a and 10b are mounted for joint rotation on axis 10c; gears 11a, 11b are similarly mounted for joint rotation on axis 11c. The gears 10a and 11a are concentric to the respective axes 10c and 11c, whereas the gears 10b and 11b are eccentric relative thereto. The gears 10b, 11b mesh with one another; the gear 10a meshes with pinion 9 to be driven thereby and to drive the gears 10b, 11b which in turn drive the gear 11a that meshes with the gear on roller 5.

The gears 10a and 10b are rigidly connected with one another, so that they can rotate jointly but not relative one another. The same relationship obtains for the gears 11a, 11b. Gear 10b is eccentric relative to gear 10a; gear 11b is eccentric relative to gear 11a. The relative position of the gears 10a, 10b and 11a, 11b is such that a larger radius of the eccentric gear 10b coincides (is aligned with) a shorter radius of gear 11b, and vice versa. In other words: the sum of the radii (on a line passing through the axes 10c, 11c) is always constant (irrespective of the angular position of the gears) and equal to the distance between the centers of these axes.

The lens mount 2 has a portion 2'. A spring 2b is connected to the portion 2' and also to the housing 1 in such a manner (note the locus of connection to the housing versus the locus of connection to portion 2') that the lens mount 2 is urged permanently towards its open position (FIG. 1O. In the space between the facing walls of housing 1 and lens mount 2 there is arranged an arcuate gear segment 7 which is composed of at least two discrete parts 7a and 7b. Part 7b is riveted or otherwise secured to the lens mount 2 at 2c. It, as well as the part 7a, are pivotable about the pivot axis 2a (they could, however, be pivotable about a different axis). The parts 7a, 7b each have a serrated (toothed) periphery 7c which is concentric to the pivot axis 2a. Part 7b is provided with an arcuate slot 7e into which a projection 7d of part 7a slidably extends, so that the parts are pivotable relative to one another within the limits imposed by the guide arrangement 7d, 7e.

In the collapsed condition of the camera (FIG. 4) the parts 7a, 7b substantially overlap one another and therefore require relatively little space as considered in the direction from front to back of the camera. The camera housing can thus be compact. In the extended position, however (FIG. 1), the parts 7a, 7b do not overlap and thus have a (combined) periphery 7c of substantial arcuate length, i.e., of a length which is much greater than the individual length of the periphery of the respective parts 7a, 7b. Thus, even though in the collapsed condition the parts 7a, 7b require but little space, in the extended condition they together offer an arcuate periphery 7c which is sufficiently long (has enough teeth) so that motion can be imparted to the pinion 9 without undue stress on the parts 7a, 7b.

A double-armed lever 8 is pivoted to the part 7a at 8'; it is biased in anti-clockwise direction by a spring 8". When the camera is extended (open) the arm 8a of lever 8 engages in front of an abutment 7f of the part 7b, so that relative pivoting of the parts 7a, 7b is precluded. The part 7a, however, is permanently biased inwardly of the housing 7a by a spring 14. Another double-armed lever, identified with reference numeral 15, is pivoted to lens mount 2 at 2d; its arm 15b travels (when lever 15 is tilted) in a path in which it acts upon the shutter cocking mechanism 3b whereas its other arm 15c travels in a path in which it eventually abuts projection 7d.

The Operation

In operation, and assuming that the camera is in the position of FIG. 1 and the lens mount 2 is pivoted towards closed position (i.e., to assume the position of FIG. 2), such (in FIG. 1 leftward) pivoting of the lens mount permits the part 7a to pivot in the same direction under the influence of spring 14. This continues until the arm 8b of lever 8 engages an abutment 1b of housing 1, as a result of which the lever 8 is now pivoted in clockwise direction counter to the action of spring 8". This causes the arm 8a to move away from the abutment 7f, so that (during the continued closing movement of lens mount 2) the part 7b can pivot relative to the part 7a. Since the parts are located in respective planes which, though close together, are nevertheless spaced from one another lengthwise of the pivot axis 2a (i.e., normal to the plane of FIG. 1), the part 7b moves in front of (as considered with reference to the viewer of FIG. 1) the part 7a, until part 7b engages in abutment 1c on housing 1. Before the teeth on the periphery of part 7a become disengaged from the pinion 9, the teeth on the periphery of part 7b move into such engagement; i.e., there is an overlap which prevents loss of pinion rotation. Of course, the cooperation of pawl 8 and abutment 7f will be appropriately selected to make this possible. Also, the projection 7d engages the arm 15c of lever 15 and pivots the latter to the position shown in FIG. 2; during this movement the arm 15b cocks the shutter 3a via the shutter-cocking mechanism 3b.

When the camera is subsequently to be reopened, i.e., when the lens mount 2 is pivoted to the position of FIG. 1, the part 7b pivots with the lens mount and eventually pulls along the part 7a via the guide 7d, 7e. The projection 7d returns the arm 15c of lever 15 from the position of FIG. 2 to the position of FIG. 1 (the shutter remains cocked in a manner known per se). Finally, the arm 8a of pawl 8 snaps back into position with respect to abutment 7f and the camera is ready for use. While the pinion 9 and rollers 5, 6 were turned during the closing movement, a free-wheeling device interposed in the motion-transmitting train between pinion and rollers (such devices are known per se and require no discussion) prevents the rotation during the opening of the camera.

Figure 4:
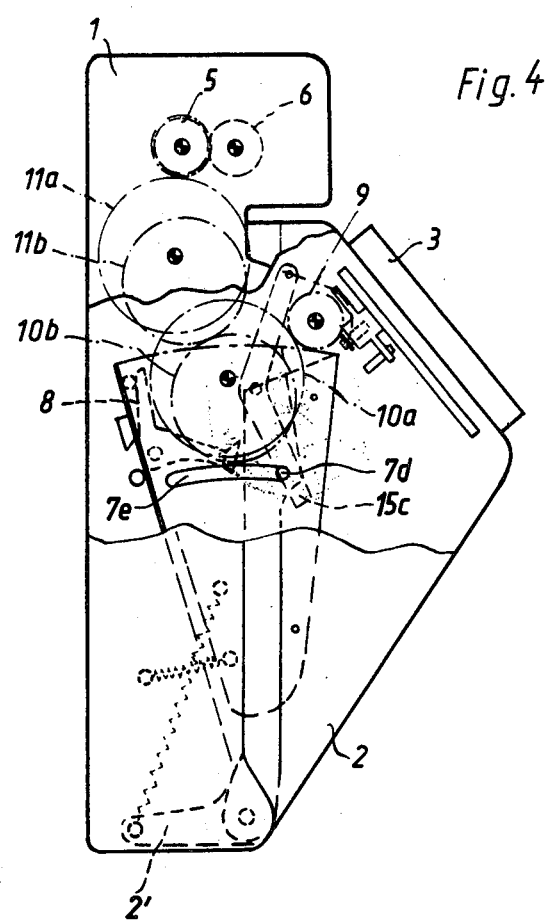
FIG. 4 shows the embodiment of FIG. 1 in the terminal phase of a transporting cycle.

During the closing movement the segment 7a, 7b rotates the pinion 9 which drives the gear 10a and, via the same, the gear 10b. This in turn rotates the gear 11b and thus via the gear 11a the roller 5. This has been previously described. FIG. 1 shows that at the beginning (during the initial phase) of the film transporting cycle the radius $a_1$ is small and the radius $a_2$ is large. Since the rotational speed of pinion 9 is (and is intended to be) constant, the roller 5 turns slowly in this transporting phase (the developer is being squeezed out of the not-illustrated film-sheet pouch). Once the gears 10 and 11 have rotated through 180° and reached the position of FIG. 2, the ratio of $a_2$ to $b_2$ (FIG. 2) is greater than one; i.e. the roller 5 now turns faster. When the position of FIG. 4 is reached (i.e. the camera is closed), the gears 10a, 10b and 11a, 11b have returned to their starting position. A known-per se free-wheeling device can be employed to keep the rollers 5, 6 from turning while the camera is subsequently opened again.

FIG. 8 shows in the curve a the approximate dependency of the relative gear transmission upon the particular film-transporting phase.

FIGS. 5-6 show another embodiment of the invention. In this embodiment two gears 20, 21 are arranged one at a level higher than (and behind) the other. They are centrally mounted for rotation on axes 20c, 21c which extend parallel to each other, and terminate at the respectively facing surfaces of the gears 20, 21. The pinion 9 meshes with gear 20 and is driven by a motor 12 (e.g. spring motor, electric motor) via a worm 13. The gear 21, on the other hand, meshes with a gear or pinion on roller 6. That axial endface of gear 20 which faces towards the gear 21 carries (e.g. integrally or suitably secured) a pin or projection 20a which extends into a radial slot 21a formed in gear 21. The slot 21a must be at least as long as the distance of the centers of axes 20c, 21c from one another.

In operation the gear 20 is rotated by pinion 9 and entrains the gear 21 via projection 20a and slot 21a, so that gear 21 rotates roller 6. In this initial operating phase (FIG. 5) the lever arm $a_1$ acting between gears 20 and 21 is long, so that the roller 6 turns slowly. When the gears have turned through 180° (FIG. 6) the relationships are reversed, i.e. the lever arm b is shorter and the transmission ratio correspondingly reduced so that roller 6 turns faster. The curve a of FIG. 8 is thus applicable to FIGS. 5 and 6, also.

FIG. 7, finally, shows a variation of the drive described with reference to FIGS. 5 and 6. The embodiment is essentially the same as in those Figures, except that the slot 21b in gear 21' is curved instead of straight. The transmission of forces obtained with this embodiment corresponds to the broken-line curve b in FIG. 8.

The invention is susceptible of various modifications which are intended to be encompassed within the protection of the appended claims. For example, the curves a or b can be changed by relocating the position of the respective slot on its associated gear and/or changing the shape of the slot. Drives can be used having, e.g., elliptical gears, oval gears, non-circular gears. Instead of gear drives, cam drives could be used.

Certain elements have been omitted in the drawings but could (or would normally) be present in the illustrated embodiments. No details of the shutter mechanism, shutter-cocking mechanism or of the gripper (usually used in instant cameras to expel the respective film sheets from the film pack and into the nip of rollers 5, 6) have been shown. The embodiment of FIGS. 1-4 could be motor-driven (e.g. as described relative to FIGS. 5-6) and the one in FIGS. 5-6 could be manually operated (e.g. as described relative to FIGS. 1-4). In lieu of the illustrated manual drive for pinion 9, other types of manual drives could be employed.

While the invention has been illustrated and described as embodied in a photographic camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a camera, a combination comprising a camera housing; a film transporting mechanism in said housing and requiring for its operation different amounts of energy during different phases of a film-transporting cycle; and drive means for said film transporting mechanism and operative to supply the required different amounts of energy to the same during different phases of each film-transporting cycle while requiring a substantially constant energy input, said drive means comprising an energy source, and a gear unit having an input shaft driven by said energy source, two parallel rotary shafts, a pair of substantially parallel discs each rotatably mounted on one of said shafts, one of said discs having a substantially radial slot and the other of said discs having an axial projection slidably received in said slot, said drive means rotating one of said discs and the other of said discs being entrained by said one disc and having an annulus of teeth which mesh with an element of said mechanism.

2. A combination as defined in claim 1, wherein said gear which supplies to said mechanism peak amounts of energy in the initial and terminal phases of each film-transporting cycle.

3. A combination as defined in claim 2; further comprising at least one additional mechanism in said camera and operatively associated with said drive means to receive energy therefrom during at least one of said initial and terminal phases.

4. A combination as defined in claim 1, wherein said slot is straight.

5. A combination as defined in claim 1, wherein said slot is arcuately curved.

6. A combination as defined in claim 1, wherein said camera is an instant-picture camera, and said mechanism comprises a pair of nip rollers forming a nip through which an instant-picture film sheet passes during each cycle so as to have developer squeezed from a developer pouch during the initial phase of the cycle and entrapped in a developer trap during the terminal phase of the cyle.

7. In a camera, a combination comprising a camera housing; a film transporting mechanism in said housing and requiring for its operation different amounts of energy during different phases of a film-transporting cycle; and drive means for said film transporting mechanism and operative for supplying the required different amounts of energy to the same during different phases of each film-transporting cycle while requiring a substantially constant energy input, said drive means comprising an energy source, and a gear unit having an input shaft driven by said energy source, two parallel shafts, a compound gear rotatably mounted on each of said shafts and comprising a first gear element which is concentric to and a second gear element which is eccentric to the associated shaft, said second gear elements meshing with one another and said first gear elements being drivingly associated with said input shaft and with said mechanism, respectively.

* * * * *